United States Patent

Nagata et al.

[15] 3,644,716

[45] Feb. 22, 1972

[54] INFORMATION CARD

[72] Inventors: Masanori Nagata; Kiyotaka Fukushima, both of Kyoto, Japan

[73] Assignee: Omron Tateisi Electronics Co., Kyoto, Japan

[22] Filed: Dec. 11, 1969

[21] Appl. No.: 884,132

[30] Foreign Application Priority Data

Dec. 25, 1968 Japan.................................43/113323

[52] U.S. Cl.........................................................235/61.12 M

[51] Int. Cl.........................................................G06k 19/02

[58] Field of Search...........235/61.12 R, 61.12 NP, 61.12 M, 235/61.114; 340/149 A

[56] References Cited

UNITED STATES PATENTS

| | | | |
|---|---|---|---|
| 3,279,826 | 10/1966 | Ruderhausen et al | 235/61.12 R |
| 3,387,265 | 6/1968 | Smeiman | 235/61.12 R |
| 3,308,010 | 3/1967 | Engelhardt et al. | 235/61.12 N |

*Primary Examiner*—Daryl W. Cook
*Attorney*—Christensen and Sanborn

[57] ABSTRACT

An information card of the magnetic-type in which card information is magnetically recorded. The card comprises a base sheet made of a thermoplastic material having a desired rectangular shape and a thickness enough to give the card required mechanical strength, and a magnetic sheet consisting of a support layer of the same thermoplastic material as the material of the card base and a magnetizable layer formed on one surface of the support layer. The magnetizable layer may be covered with a protective coating. The magnetic sheet and the card base are put together with the other surface of the support layer being in contact with one surface of the card base. The card base and the magnetic sheet are then heated and compressed so that the contacting portions of the material of the card base and the support layer of the magnetic sheet are fused together to produce a card of unitary construction. The exposed surface of the card base may be provided with symbols printed thereon expressing necessary information, and this surface may be covered by a transparent coating for protection of the printed information.

6 Claims, 2 Drawing Figures

Figure 1:
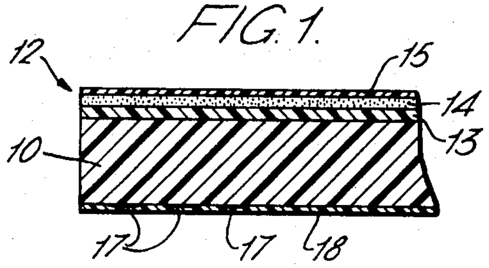

INVENTORS
MASANORI NAGATA
KIYOTAKA FUKUSHIMA
BY Christensen, Sanborn & Matthews
ATTORNEYS

INFORMATION CARD

This invention relates to an information card and, more particularly to improvements in an information card of such a type that card information is magnetically recorded thereon.

In recent years, credit cards have come into wide use in various sales transactions in hotels, restaurants, department stores, banks and many other establishments, and there must be recorded on such cards various informations required for and resulting from such transactions. In one type of cards, such informations are recorded by means of punched holes arranged in accordance with a predetermined code. In another type of cards, they are magnetically recorded. In the latter case, the cards are provided with a magnetizable layer on which the required information is recorded by magnetizing certain points or areas of the magnetizable layer. There are various types of magnetic sheets or tapes available in the market. However, such commercially available magnetic sheets or tapes are not suitable for use as information cards since such sheets or tapes include a basic film or layer for supporting the magnetizable layer, and the basic film is about 0.03 to 0.05 mm. thick which is too thin to withstand frequent manipulation of the cards. To make a stronger card from such a thin tape or sheet, the magnetizable layer of the tape or sheet may be transferred onto a comparatively thick card base, or the tape or sheet as a whole may be adhered to such a support card base. In the former case, the magnetic sheet is placed on a card base of a suitable thermoplastic material, with the magnetizable layer of the former sheet being in contact with one surface of the latter base, and the laminated sheets are compressed while heating them to a temperature lower than the softening point of the basic film of the former sheet or tape and higher than that of the card base, so that the magnetizable layer will be transferred from the film to be adhered onto the surface of the card base. However, this method requires the step of laminating the magnetic sheet and the card base, and strict control of pressure and heat to be applied to the sheets to be laminated. Moreover, the transfer of the magnetizable layer from the magnetic sheet to the card base will render rugged the smooth surface of the magnetizable layer, which must be smoothed again.

In the latter case, that is, to adhere the magnetic tape or sheet as a whole to a card base, suitable adhesive is applied to one surface of the base, onto which the bottom surface of the magnetic tape or sheet is applied and pressed. This method, however, requires the step of applying adhesive to the surface of one or both of the sheets to be laminated together, and consequently is not suitable for mass production. Moreover, the card thus formed cannot endure long use since the laminated sheets are likely to be separated.

Accordingly, it is one object of the invention to provide an information card of the magnetic type which is easy in manufacture, suitable for mass production and low in manufacturing cost.

Another object of the invention is to provide such an information card as aforesaid which comprises a magnetic sheet and a card base laminated together into a card of unitary construction.

Another object of the invention is to provide such an information card as aforesaid in which a magnetic sheet having a magnetizable layer is combined with a card base without substantially injuring the smooth surface of the magnetizable layer.

A further object of the invention is to provide such an information card as aforesaid in which once the magnetic sheet has been fused to the card base to form a card of unitary construction, they cannot be separated from each other in normal use of the card.

Still another object of the invention is to provide such an information card as aforesaid which is substantially free from deformation.

An additional object of the invention is to provide such an information card as aforesaid which comprises a card base, a magnetic sheet and a protective coating, all these three being simultaneously laminated into a card of unitary construction.

In one preferred embodiment of the invention, the information card comprises a magnetic sheet consisting of a magnetizable layer formed on one surface of a support layer of a thermoplastic material, and a card base of the same thermoplastic material as the support layer of the magnetic sheet. Vinyl chloride is suitable as the plastic material for the card base and the support layer of the magnetic sheet. The thickness of the base is such as to give the card the required mechanical strength. Preferably it is 0.6 to 0.8 mm. thick when the material is vinyl chloride, with the magnetic sheet being 0.03 to 0.15 mm. thick.

To laminate the magnetic sheet and the card base, the former is placed on the latter with the bottom surface of the support layer of the former sheet being in contact with one surface of the latter card base, and the laminated sheet and base are simultaneously heated and compressed into a card of unitary construction. Since the support layer of the magnetic sheet and the card base are of the same thermoplastic material, the application of heat and pressure to the base and sheet will cause them to be fused into a card of unitary construction, so that no separation of the two fused sheets will occur. No strict control is required of the temperature at which the laminating process is carried out. The magnetic sheet and the card base may be manufactured separately so that mass production of the respective sheets is possible with resulting reduction of the manufacturing costs. The upper exposed surface of the magnetizable layer may be covered with a thin coating for protection against injury or damage which might cause disappearance of the recorded card information, and consequently for longer life of the card. The bottom surface of the card base opposite to the surface thereof to which the magnetic sheet is fused may be provided with letters and/or symbols printed thereon and expressing necessary information such as the identification number of the card. In this case the bottom surface is preferably covered with a protective coating such as not to conceal the printed letters and/or symbols from view. This protective coating may be formed by applying a thin transparent film of a suitable thermoplastic material such as vinyl chloride onto the card base simultaneously with the lamination of the magnetic sheet and the card base.

Figure 2:
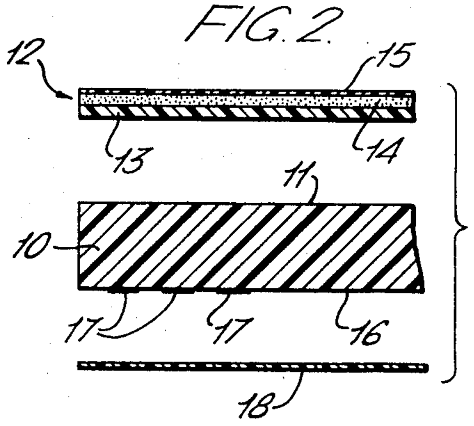

The invention will be better understood from the following description of a preferred embodiment thereof with reference to the accompanying drawing, wherein:

FIG. 1 is a fragmentary enlarged sectional view of an information card constructed in accordance with the invention; and FIG. 2 is a view similar to FIG. 1 but showing the component layers or sheets before they are laminated together.

Referring now in detail to the drawings, there is shown a card base 10 which provides mechanical strength for the finished information card. The base 10 has a desired rectangular shape and is made of a suitable thermoplastic material, such as vinyl chloride. A magnetic sheet 12 comprises a support layer 13 of the same thermoplastic material as the card base 10, a magnetizable layer 14 formed on the upper surface of the support layer 13, and a top layer or coating 15 on the upper surface of the magnetizable layer 14 for protection thereof against physical damage. The layer 14 is adapted to have various information magnetically recorded thereon and read therefrom, and the coating 15 must be of such a material and thickness as not to prevent the magnetic recording and reading of the information on and from the layer 14. The magnetic sheet 12 may be manufactured separately from the card base 10 in the manner well known in the art.

The magnetic sheet 12 is laminated onto one surface 11 of the card base 10 as will be described later in detail. On the other surface 16 of the card base 10 opposite to the surface 11 thereof to which the magnetic sheet 12 is fused there may be printed symbols and/or letters 17 expressing, say, the identification number of the card and the like. Such printing may advantageously be performed before the lamination of the base 10 and the sheet 12. The printed letters and/or symbols are likely to become dirty or worn off. To avoid this, a protective coating 18 may be provided over the bottom surface 16 of the card base 10. The coating 18 must be such that printed symbols and/or letters can be seen through the coating 18. Preferably, the coating 18 is formed or laminated on the card base 10 simultaneously with the lamination of the card base 10 and the magnetic sheet 12. To this end, the coating 18 may be formed by applying to the card base 10 a film of the same thermoplastic material as the card base 10. The film 18 is manufactured separately from the card base 10 and the magnetic sheet 12, and these three sheets or layers are put together in the above-mentioned manner and then compressed, while applying heat thereto, into the required information card of unitary construction.

What we claim is:

1. An information card comprising: a card base of a thermoplastic material having a thickness enough to give said card substantial mechanical strength; and a magnetic sheet consisting of a magnetizable layer in which card information is recorded and a support layer on one surface of which said magnetizable layer is formed, said support layer being made of the same thermoplastic material as said card base; said card base and said magnetic sheet being laminated, with the other surface of said support layer being in contact with one surface of said card base, and compressed while applying heat thereto, so that the material of said support layer and that of said card base are fused together to form said base and sheet into a card of unitary construction.

2. The information card of claim 1, further including a coating formed on the exposed surface of said magnetizable layer for protection thereof against physical damage.

3. The information card of claim 1, wherein said card base and said support layer of said magnetic sheet are both of vinyl chloride.

4. The information card of claim 1, wherein said card base is provided with symbols and letters expressing predetermined information printed on the surface thereof opposite to the surface which is fused to said support layer of said magnetic sheet.

5. The information card of claim 4, wherein said card base surface is covered with a transparent coating for protection of said printed information.

6. The information card of claim 5, wherein said protective coating is a film of a thermoplastic material which is laminated onto said card base simultaneously with the lamination of said magnetic sheet and said card base.

* * * * *